United States Patent
Wei et al.

(10) Patent No.: US 11,113,363 B2
(45) Date of Patent: Sep. 7, 2021

(54) INDOOR EVENT DETECTION SYSTEM AND METHOD

(71) Applicant: WISTRON NEWEB CORPORATION, Hsinchu (TW)

(72) Inventors: Ya-Ping Wei, Hsinchu (TW); Horen Chen, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 405 days.

(21) Appl. No.: 16/202,150

(22) Filed: Nov. 28, 2018

(65) Prior Publication Data

US 2020/0167409 A1 May 28, 2020

(51) Int. Cl.
G06F 17/18 (2006.01)
G01S 13/04 (2006.01)
G01S 13/00 (2006.01)
G06F 17/16 (2006.01)

(52) U.S. Cl.
CPC ............ *G06F 17/18* (2013.01); *G01S 13/003* (2013.01); *G01S 13/04* (2013.01); *G06F 17/16* (2013.01)

(58) Field of Classification Search
CPC ........ G06F 17/18; G06F 17/16; G01S 13/003; G01S 13/04
See application file for complete search history.

(56) References Cited

U.S. PATENT DOCUMENTS

| | | | | |
|---|---|---|---|---|
| 2012/0293360 A1* | 11/2012 | Hasegawa | ............... | G01S 13/34 342/146 |
| 2016/0330641 A1* | 11/2016 | Zhang | ............... | H04W 72/0453 |
| 2019/0166030 A1* | 5/2019 | Chen | ................... | H04L 25/4902 |

* cited by examiner

*Primary Examiner* — Donald HB Braswell
(74) *Attorney, Agent, or Firm* — McClure, Qualey & Rodack, LLP

(57) ABSTRACT

An indoor event detection system includes a transmitter and a receiver. The transmitter includes a first antenna, and the receiver includes a second antenna, a processor and a memory. The receiver communicates with the transmitter based on a line of sight link between the transmitter and the receiver covering an area to be detected in the indoor space. The processor detects whether an event associated to the indoor space is occurred by obtaining a current CSI from the probe signal, obtaining an amplitude matrix by extracting a plurality amplitudes of a plurality of sub-carriers from the current CSI, applying a statistical operation on the amplitude matrix to obtain a statistical matrix, obtaining a plurality of eigenvalues from the statistical matrix, obtaining a current eigenvalue statistical value according to the plurality of eigenvalues; and determining whether the current eigenvalue statistical value is within the first eigenvalue range.

8 Claims, 12 Drawing Sheets

INDOOR EVENT DETECTION SYSTEM AND METHOD

FIELD OF THE DISCLOSURE

The present disclosure relates to an indoor detection system and method, and more particularly to an indoor detection system and method that may utilize directional antennas and analyze characteristic values of amplitudes of channel state information (CSI).

BACKGROUND OF THE DISCLOSURE

The existing guard event detection system using CSI for an indoor space includes two phases, an offline training phase and an online testing phase. During the offline training phase, CSI corresponding to certain predefined-events is collected for establishing information for comparison associated with event detections.

During the online detecting phase, omni-directional antennas are utilized in both transmitting and receiving ends (TX and RX) for transmitting and receiving probing signal while obtaining CSI.

However, changes for the environment of the indoor space, such as furniture, affect the accuracy of comparison while using the information for comparison associated with the event detections established in the offline training phase.

Since the changes in the environment significantly affect the multipath effect while the CSI is obtained, the offline training phase is required to be performed again.

SUMMARY OF THE DISCLOSURE

In response to the above-referenced technical inadequacies, the present disclosure provides an indoor detection system and method.

In one aspect, the present disclosure provides an indoor event detection system, including a transmitter and a receiver. The transmitter is disposed at a first position in an indoor space, which includes a first antenna having a transmitting direction. The receiver is disposed at a second position in the indoor space, which includes a second antenna, a processor and a memory. The second antenna communicates with the transmitter based on a line of sight link between the transmitter and the receiver covering an area to be detected in the indoor space, and the transmitter is configured to send a probe signal toward the transmitting direction, and the receiver is configured to receive the probe signal. The memory stores first event channel state information (CSI) and a first eigenvalue range obtained from the first event CSI. The processor is configured to detect whether an event associated to the indoor space is occurred by performing the following steps: obtaining a current CSI from the probe signal; obtaining an amplitude matrix by extracting a plurality amplitudes of a plurality of sub-carriers from the current CSI; applying a statistical operation on the amplitude matrix to obtain a statistical matrix; obtaining a plurality of eigenvalues from the statistical matrix; obtaining a current eigenvalue statistical value according to the plurality of eigenvalues; and determining whether the current eigenvalue statistical value is within the first eigenvalue range. When the current eigenvalue statistical value is within the first eigenvalue range, a first event associated with the indoor space is determined to be occurred.

In one aspect, the present disclosure provides an indoor event detection method, which includes: arranging a transmitter at a first position in an indoor space, wherein the transmitter includes a first antenna having a transmitting direction; arranging a receiver at a second position in the indoor space, in which the receiver includes a second antenna communicating with the transmitter based on a line of sight link between the transmitter and the receiver covering an area to be detected in the indoor space, a processor and a memory storing first event channel state information (CSI) and a first eigenvalue range obtained from the first event CSI; configuring the transmitter to send a probe signal toward the transmitting direction; configuring the receiver to receive the probe signal; configuring the processor to detect whether an event associated to the indoor space is occurred by performing the following steps: obtaining a current CSI from the probe signal; obtaining an amplitude matrix by extracting a plurality amplitudes of a plurality of sub-carriers from the current CSI; applying a statistical operation on the amplitude matrix to obtain a statistical matrix; obtaining a plurality of eigenvalues from the statistical matrix; obtaining a current eigenvalue statistical value according to the plurality of eigenvalues; and determining whether the current eigenvalue statistical value is within the first eigenvalue range. When the current eigenvalue statistical value is within the first eigenvalue range, a first event associated with the indoor space is determined to be occurred.

Therefore, the indoor detection system and method provided by the present disclosure may utilize directional antennas for aiming at a region associated with an event to be detected to reduce costs of re-training, while analyzing eigenvalues of amplitudes of channel state information (CSI) to achieve an event detection mechanism with high stability.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1A:
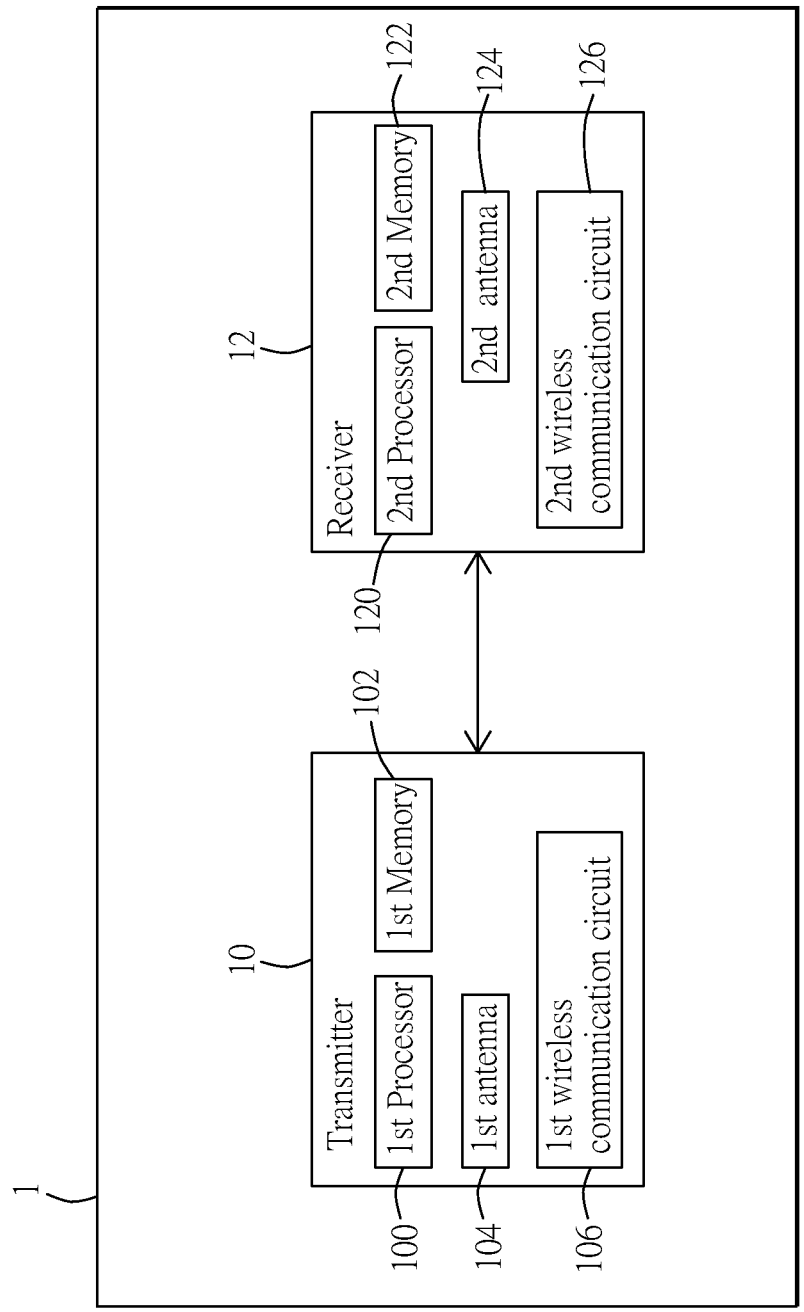
FIG. 1A shows a block diagram of an indoor event detection system is depicted in accordance with an exemplary embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1B:
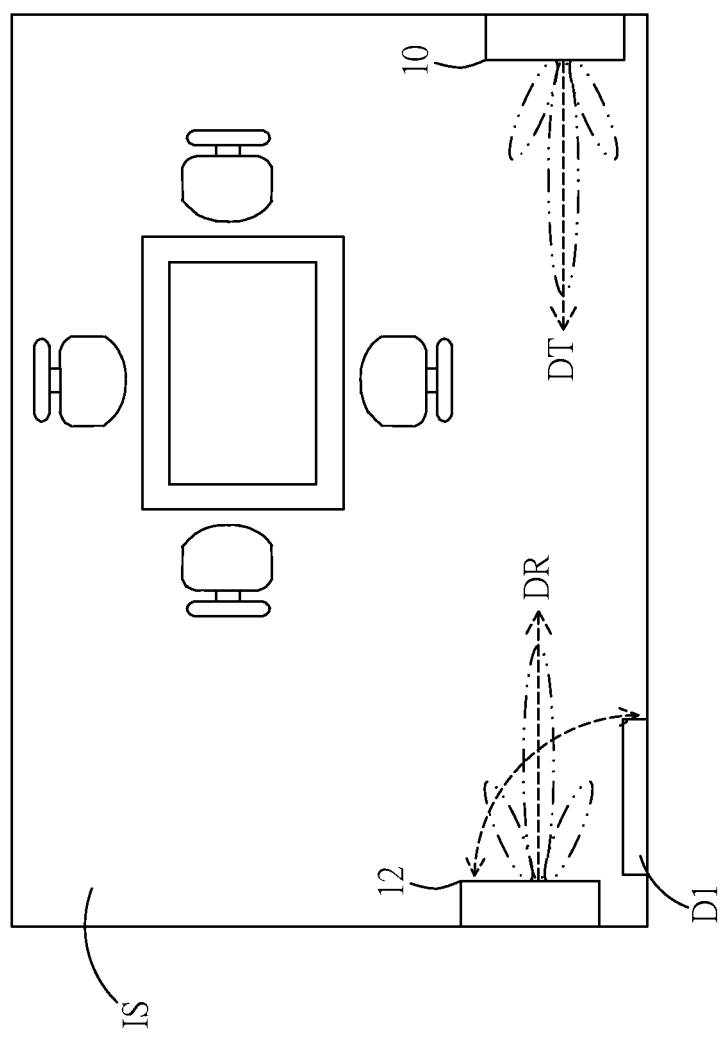
FIG. 1B shows a schematic diagram illustrating an arrangement layout of the indoor event detection system according to an embodiment of the present disclosure.

Referring to FIGS. 1A and 1B, FIG. 1A shows a block diagram of an indoor event detection system depicted in accordance with an exemplary embodiment of the present disclosure, and FIG. 1B shows a schematic diagram illustrating an arrangement layout of the indoor event detection system according to an embodiment of the present disclosure.

As shown in FIGS. 1A and 1B, an indoor event detection system 1 may be implemented in any type of computing device. In this embodiment, the indoor detection event system 1 may include a transmitter 10 and a receiver 12. The transmitter 10 includes a first processor 100, a first memory 102, a first antenna 104, and a first wireless communication circuit 106 for controlling a transmitting direction DT of the first antenna 104. The first wireless communication circuit 106 supports a plurality of protocols and may be used to transmit wireless signals having different working frequencies. Furthermore, the protocols may be wireless communication standard, such as, IEEE 802.11, 3G/4G/5G standards.

The receiver 12 includes a second processor 120, a second memory 122, a second antenna 124, and a second wireless communication circuit 126. The receiver 12 may further include a wireless communication circuit for controlling a receiving direction DR of the second antenna 124. The transmitter 10 and the receiver 12 may be disposed at a first position and a second position in the indoor space IS, respectively, and similarly, the second wireless communication circuit 126 supports a plurality of protocols and may be used to transmit wireless signals having different working frequencies. Furthermore, the protocols may be wireless communication standard, such as, IEEE 802.11, 3G/4G/5G standards.

In the present disclosure, the transmitter 10, the receiver 12, or both are equipped with directional antennas for transmission and reception, the first and second antennas 104 and 124 target a region to be detected while reducing a detection angle. The first antenna 104 and the second antenna 124 may each be a directional antenna, such as a Radiation-Pattern-Reconfigurable Antenna, an antenna array with beamforming techniques or a horn antenna. The second antenna 124 may also be configured to be an omni-directional antenna, which communicates with the transmitter 10 based on a line of sight link between the transmitter 10 and the receiver 12 that covers an area to be detected in the indoor space IS, such as an area adjacent to a door D1 to be detected. During a probing phase, the transmitter 10 is configured to send a probe signal toward the transmitting direction, and the receiver 12 is configured to receive the probe signal. It should be noted that when a distance between the receiver 12 and the transmitter 10 is over a predetermined distance, the second antenna may be configured to be a directional antenna. When a distance between the receiver 12 and the transmitter 10 is less than a predetermined distance, the second antenna may be configured to be an omni-directional antenna The first and second processors 100 and 120 serve to execute instructions for software or firmware that may be loaded into the first memory 102 and the second memory 122, respectively. The first and second processors 100 and 120 may be a set of one or more processors or may be a multi-processor core, depending on the particular implementation. Further, the first and second processors 100 and 120 may be implemented using one or more heterogeneous processor systems in which a main processor is present with secondary processors on a single chip. As another illustrative example of the embodiment, the first and second processors 100 and 120 may be a symmetric multiprocessor system containing multiple processors of the same type.

Furthermore, the first and second processors 100 and 120 may be provided for controlling the transmitter 10 and the receiver 12. Specifically, the first and second processors 100 and 120 may be configured to perform an event detection algorithm stored in the first memory 102 and the second memory 122 for detecting indoor event associated with an indoor space IS.

Each of the first memory 102 and the second memory 122, in these examples, may be a random access memory. The first memory 102 and the second memory 122 may take various forms depending on the particular implementation. For example, each of the first memory 102 and the second memory 122 may be a hard drive, a flash memory, a rewritable optical disk, a rewritable magnetic tape, or any combination thereof.

For the event detection, the second memory 122 stores first event channel state information (CSI) and a first eigenvalue range obtained from the first event CSI. Here, CSI is information that can represent the channel properties of a communication link to thereby estimate the channel. More specifically, CSI describes how a signal propagates from the transmitter(s) to the receiver(s) and reveals the combined effect of, for instance, scattering, fading, and power decay with distance.

In detail, during a channel probing phase, the transmitter 10 sends a probe signal to the receiver 12, which produces an estimated CSI for the multipath channel between the transmitter 10 and the receiver 12. Therefore, when one indoor event occurs, the received multipath profile varies correspondingly. As a consequence, the spatial-temporal resonance at the receiver side changes and can be used to track the events in the indoor space IS.

In the indoor event detection system 1 of the present disclosure, eigenvalues of amplitudes of CSI are obtained for determining whether the indoor event is occurred. In detail, eigenvalues are obtained to reduce the complexity and the dimension of CSI matrix during the event detection, the main eigenvalues are analyzed while retaining the maximum variation between the original variables in the CSI matrices, with the eigenvalues as a principle component to be analyzed, so as to ensure the accuracy of the event detection.

Figure 2A:
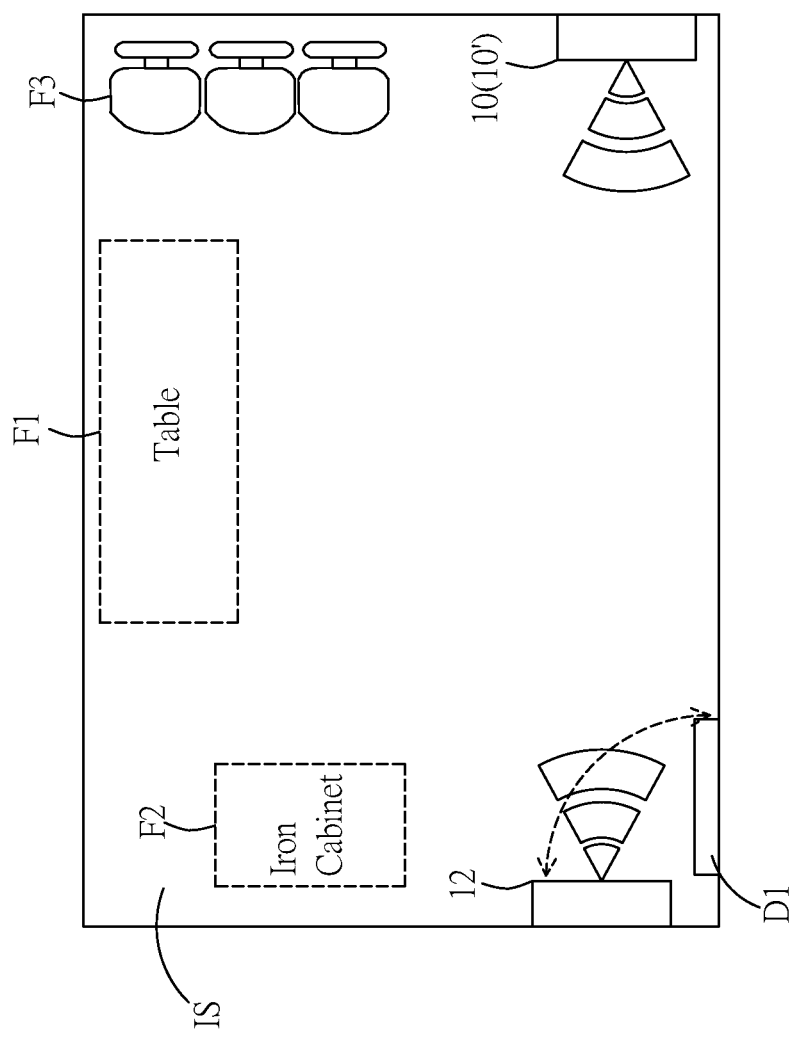
FIGS. 2A to 2C are schematic diagrams of three different arrangements for the indoor space according to embodiments of the indoor event detection system of the present disclosure.
Figure 2B:
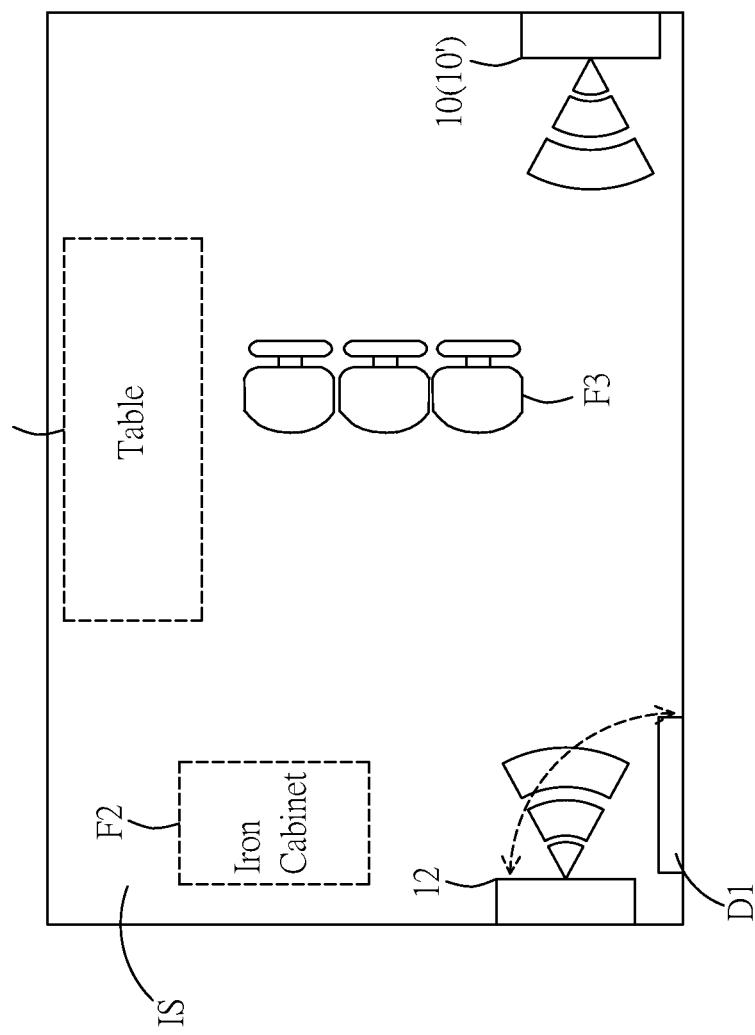
Figure 2C:
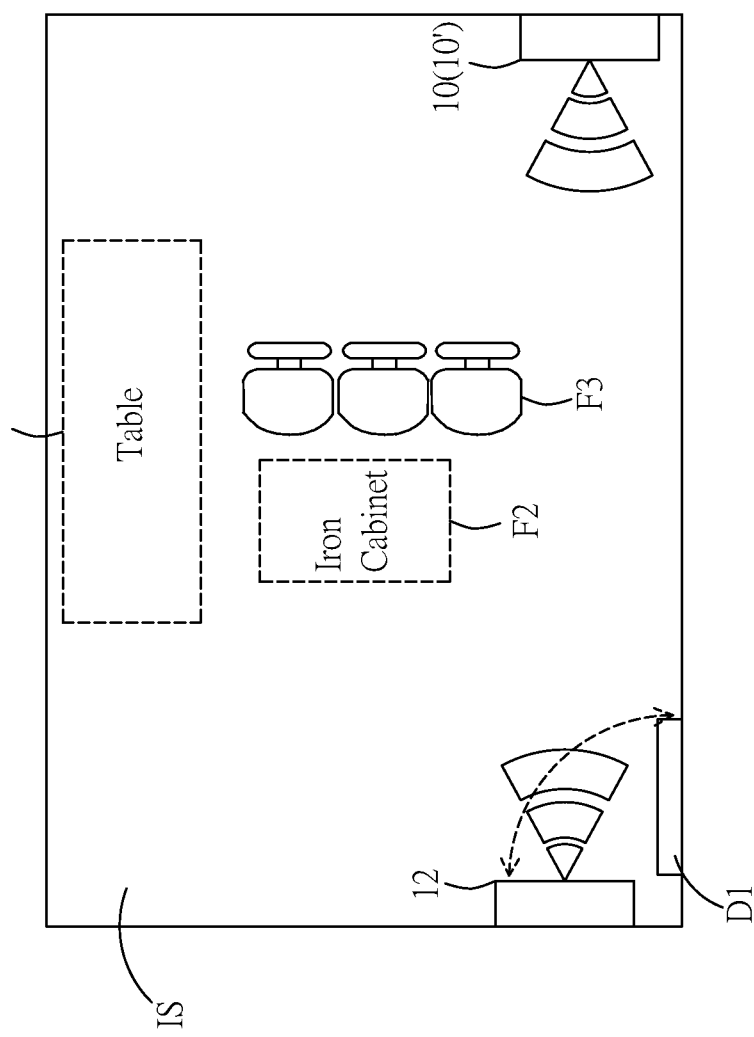
Figure 2D:
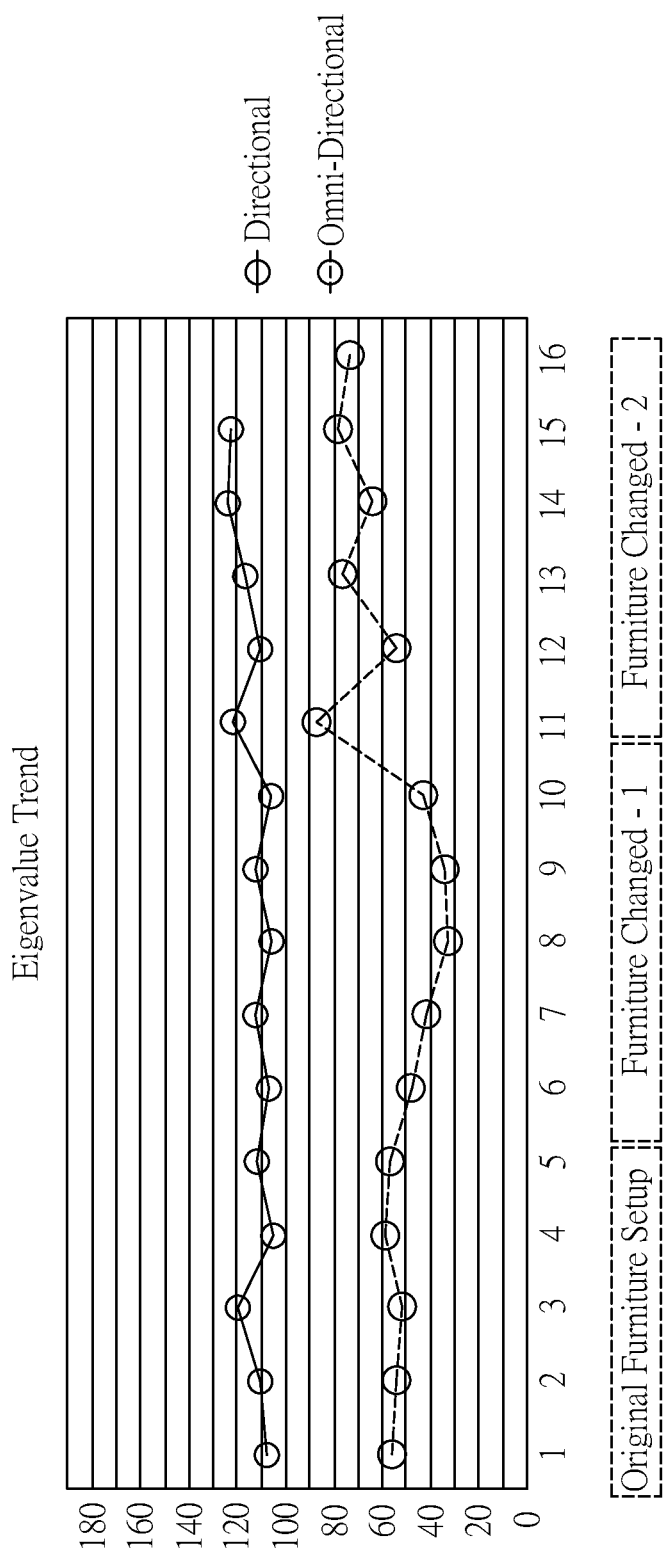
FIGS. 2D and 2E are graphs showing trends of eigenvalue obtained by using directional antenna and omni-directional antenna.
Figure 2E:
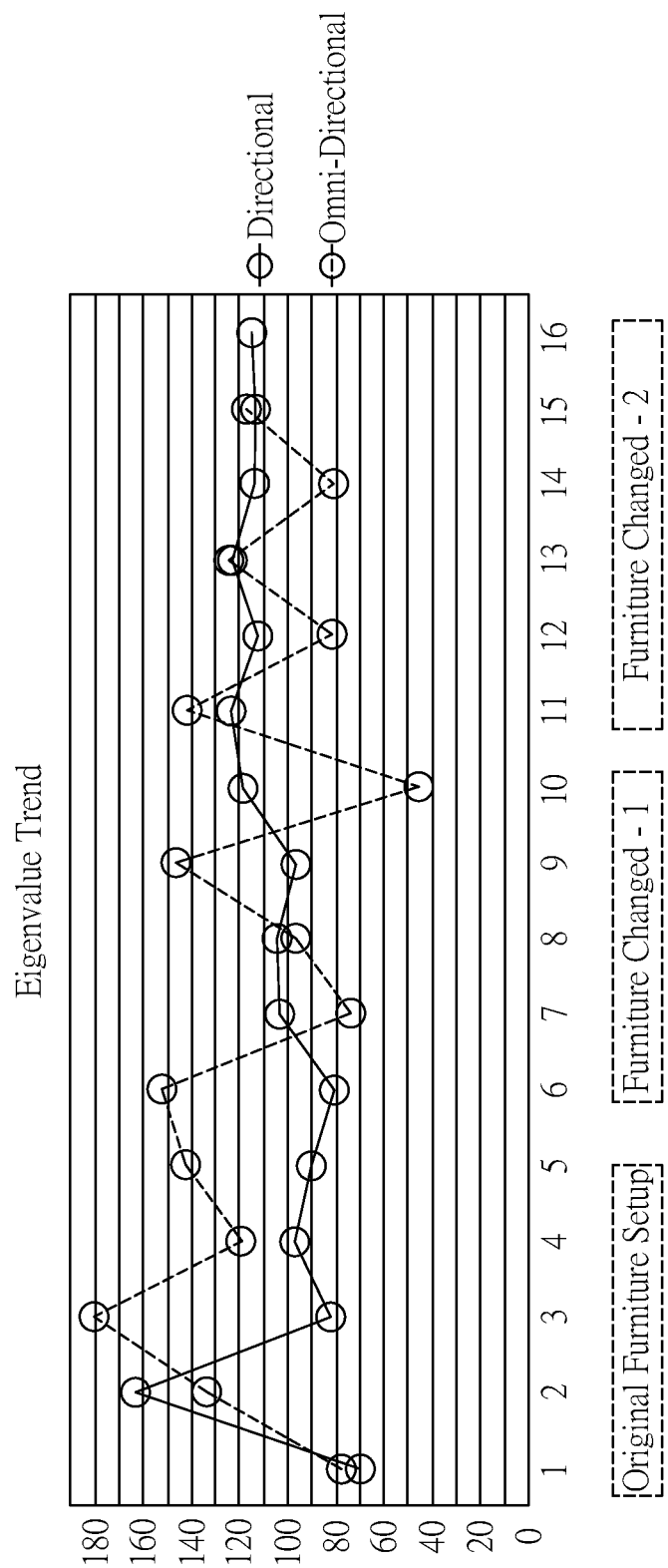

FIGS. 2A to 2C are schematic diagrams of three different arrangements for the indoor space according to embodiments of the indoor event detection system of the present disclosure, and FIGS. 2D and 2E are graphs showing trends of eigenvalue obtained by using directional antenna and omni-directional antenna in the transmitter.

In FIG. 2A, the transmitters 10 and 10' are disposed at the same position, and the receiver 12 is disposed adjacent to the door D1 to be detected, and a table F1, an iron cabinet F2 and a set of chairs F3 are disposed as shown in FIG. 2A. In this case, the transmitter 10 is provided with a directional antenna having a transmitting direction toward the receiver 12, and the transmitter 10' is provided with an omni-directional antenna. In FIGS. 2B and 2C, positions of the set of chairs F3, and the iron cabinet F2 are changed, respectively. As shown in the FIG. 2D, CSI is obtained when no motion occurs in the indoor space IS and the door is closed. Even if the furniture changes its position several times, the variation level of the eigenvalues of the CSI of the directional antenna would have a relatively stable trend.

As shown in the FIG. 2D, CSI is obtained when the door D1 is dynamically opened. Similarly, even if the furniture changes its position several times, the variation level of the eigenvalues of the CSI of the directional antenna would still have a relatively stable trend with respect to that of the omni-directional antenna.

Therefore, it can be understood that after the transmission is performed by the directional antenna, and the collected CSI and the data of the amplitude are extracted for analysis, the characteristic values of the respective subcarriers can be obtained. Then, the feature values with the largest variation are sorted in order, and the degree of variation of the feature values can be observed as the position of the furniture changes, that is, the standard deviation of the directional antenna is significantly smaller than that of the omnidirectional antenna when the door is closed and when the door is dynamically opened. Therefore, the reliability of offline data in event detection can still be maintained.

Figure 3:
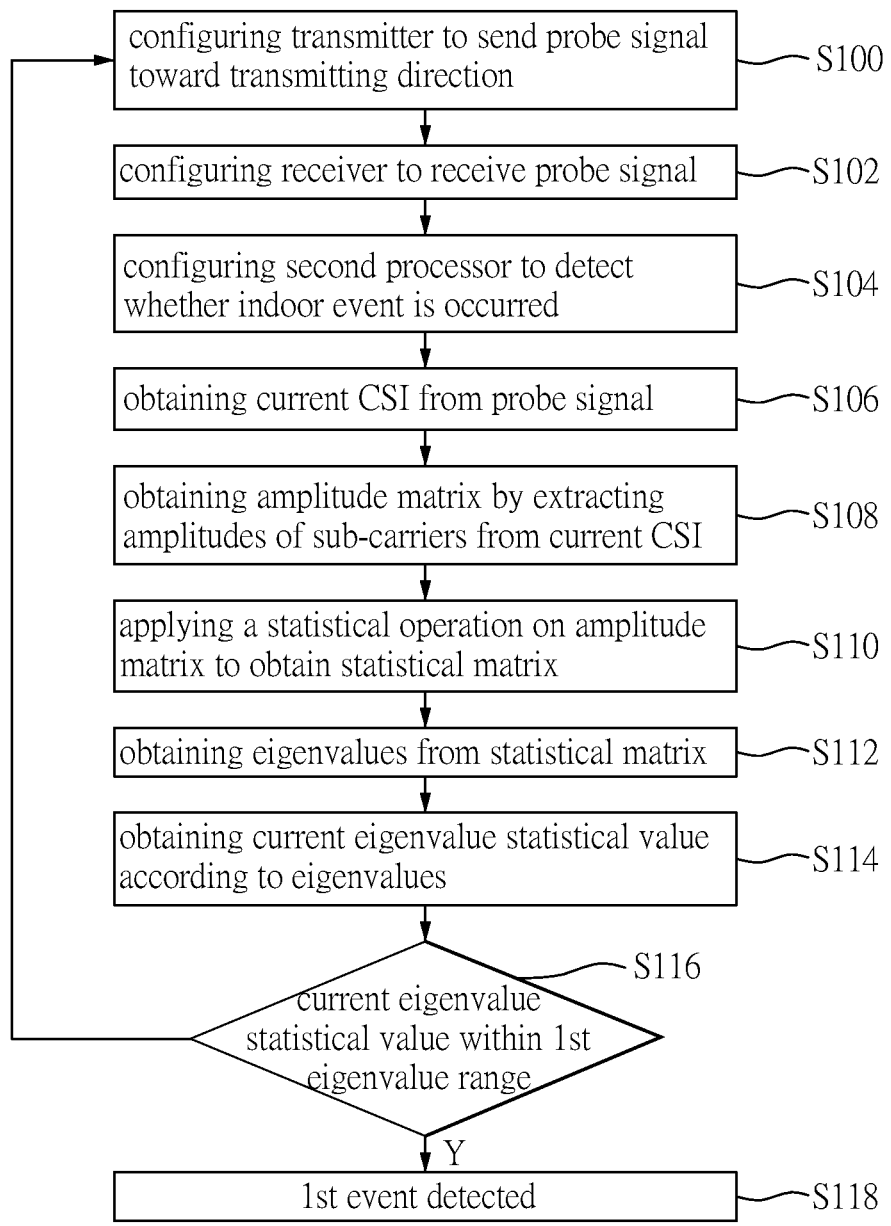
FIG. 3 is a flowchart according to an embodiment of the indoor event detection method of the present disclosure.

Reference is now made to FIG. 3, which is a flowchart according to an embodiment of the indoor event detection method of the present disclosure.

As shown in FIG. 1B, the transmitter 10 is arranged at a first position in the indoor space IS, and the transmitter 10 includes the first antenna 104 having a transmitting direction DT. Further, the receiver 12 is arranged at a second position in the indoor space IS, the receiver 12 includes the second antenna 124 communicating with the transmitter 10 based on a line of sight link between the transmitter 10 and the receiver 12 while covering an area to be detected in the indoor space IS, as shown in FIGS. 1A and 1B. Moreover, the receiver 12 also includes the second processor 120 and the second memory 122 storing first event channel state information (CSI) and a first eigenvalue range obtained from the first event CSI.

During the online detecting phase, that is, step S100, the transmitter 10 is configured to send a probe signal toward the transmitting direction DT.

Step S102: configuring the receiver 12 to receive the probe signal.

Step S104: configuring the second processor 120 to detect whether an event associated to the indoor space IS is occurred by performing the following steps:

Step S106: obtaining a current CSI from the probe signal.

Step S108: obtaining an amplitude matrix by extracting a plurality of amplitudes of a plurality of sub-carriers from the current CSI.

Step S110: applying a statistical operation on the amplitude matrix to obtain a statistical matrix.

Step S112: obtaining a plurality of eigenvalues from the statistical matrix.

Step S114: obtaining a current eigenvalue statistical value according to the plurality of eigenvalues.

Step S102: determining whether the current eigenvalue statistical value is within the first eigenvalue range.

If the current eigenvalue statistical value is within the first eigenvalue range, the method proceeds to step S118, a first event associated with the indoor space is determined to be occurred.

In the embodiment, the statistical operation in step S110 may include performing a covariance operation on the amplitude matrix to obtain a current covariance matrix as the statistical matrix.

In this case, the total error of the variables in the current CSI is measured by calculating the covariance. The covariance matrix, taking the number of subcarriers of Atheros as an example, has a total of M subcarriers. After measuring data for time t, each subcarrier has total number of N amplitude information extracted from the current CSI to form an N*M matrix.

The amplitude matrix A0 of the current CSI may be illustrated by the following equation (1):

$$A0 = \begin{bmatrix} V11 & V12 & V13 & V14 \\ V21 & V22 & V23 & V24 \\ V31 & V32 & V33 & V34 \end{bmatrix} \quad (1)$$

Where first through fourth columns of the matrix A0 are denoted as A1, A2, A3 and A4, respectively. For two random variable vectors A and B, the covariance can be defined as following equation (2):

$$\text{cov}(A, B) = \frac{1}{N-1} \sum_{i=1}^{N} (A_i - \mu_A) * (B_i - \mu_B) \quad (2)$$

Where $\mu_A$ is the mean of A, $\mu_B$ is the mean of B, and * denotes the complex conjugate. The covariance matrix of two random variables is the matrix of pairwise covariance calculations between each variable, and the covariance matrix C can be defined as following equation (3):

$$C = \begin{bmatrix} \text{cov}(A, A) & \text{cov}(A, B) \\ \text{cov}(B, A) & \text{cov}(B, B) \end{bmatrix} \quad (3)$$

Therefore, the current covariance matrix C1 can be calculated by the following equation (4):

$$C1 = \text{COV}(A0) = \begin{bmatrix} \text{COV}(A1, A1) & \text{COV}(A2, A1) & \text{COV}(A3, A1) & \text{COV}(A4, A1) \\ \text{COV}(A1, A2) & \text{COV}(A2, A2) & \text{COV}(A3, A2) & \text{COV}(A4, A2) \\ \text{COV}(A1, A3) & \text{COV}(A2, A3) & \text{COV}(A3, A3) & \text{COV}(A4, A3) \\ \text{COV}(A1, A4) & \text{COV}(A2, A4) & \text{COV}(A3, A4) & \text{COV}(A4, A4) \end{bmatrix} \quad (4)$$

In step S112, the plurality of eigenvalues can be obtained from the statistical matrix by obtaining a diagonal eigenvalue matrix from the current covariance matrix, and elements of the diagonal eigenvalue matrix are sorted according magnitudes of the elements to obtain a sorted eigenvalue matrix, and elements of the sorted eigenvalue serve as the plurality of eigenvalues.

In detail, the diagonal matrix of the current covariance matrix C1 of the current CSI is extracted to obtain a diagonal eigenvalue matrix, which has M eigenvalues, which is the mean square error of amplitudes of each of the M subcarriers. In the M eigenvalues, the maximum one describes a maximum covariance that has highest capability for representing the covariance of all of the data.

In this embodiment, changes for the environment can be divided into a fast environment change and a slow environment change, and the corresponding eigenvalues can be used to compare and classify a door-opened scene and a door-closed scene. With the aid of the directional antenna, the obtained eigenvalues can be utilized to distinguish the events more accurately, while being used as the basis for classification.

Furthermore, the current eigenvalue statistical value can be obtained according to the plurality of eigenvalues by applying a simple or multiple linear regression on the plurality of eigenvalues to obtain at least one linear regression parameter as the current eigenvalue statistical value.

In detail, the eigenvalue changes are further observed in the data collected by the directional antenna and the omni-directional antenna. It can be found that when the door D1 is closed, the eigenvalues converge quickly while sorting the eigenvalues with an order from the largest to the smallest. However, the eigenvalue converges slowly when the door is dynamically opened. Therefore, a simple linear regression can be applied to a curve of the eigenvalues to obtain the linear regression parameter, which can be summarized that the door-closed and door-opened states can be clearly distinguished by using the directional antenna, but cannot be distinguished by using the omni-directional antenna.

Therefore, by taking average values of the historical simple regression parameter at the time of closing the door and the average value at the time of opening the door, two threshold values can, i.e., upper bound and bottom bound, be obtained as the offline reference data.

Therefore, corresponding to the simple or multiple linear regression applied to the obtained current CSI, the first event CSI stored in the second memory 122 should be obtained from another probe signal sent from the transmitter 10 when the first event occurs, and the first eigenvalue range obtained from the first event CSI by performing off-line training operations.

In the off-line training operations, a first amplitude matrix is obtained by extracting a plurality of amplitudes of a plurality of sub-carriers from the current CSI. The covariance operation is then performed on the first amplitude matrix to obtain a first covariance matrix, and a first diagonal eigenvalue matrix from the first covariance matrix is obtained.

Next, elements of the first diagonal eigenvalue matrix are sorted, according magnitudes of the elements, to obtain a first sorted eigenvalue matrix including a plurality of first eigenvalues, the simple or multiple linear regression is further applied on the plurality of first eigenvalues to obtain a first linear regression parameter. After the off-line training operations are performed to obtain multiple first linear regression parameters, the first eigenvalue range is obtained according to a mean value and a standard deviation of the multiple first linear regression parameters.

During the detecting operation, a set of simple regression parameters is also obtained, and the simple regression parameters are compared with the two thresholds of the offline reference data, and whether the door is dynamically opened or statically closed can be determined accordingly.

Figure 4A:
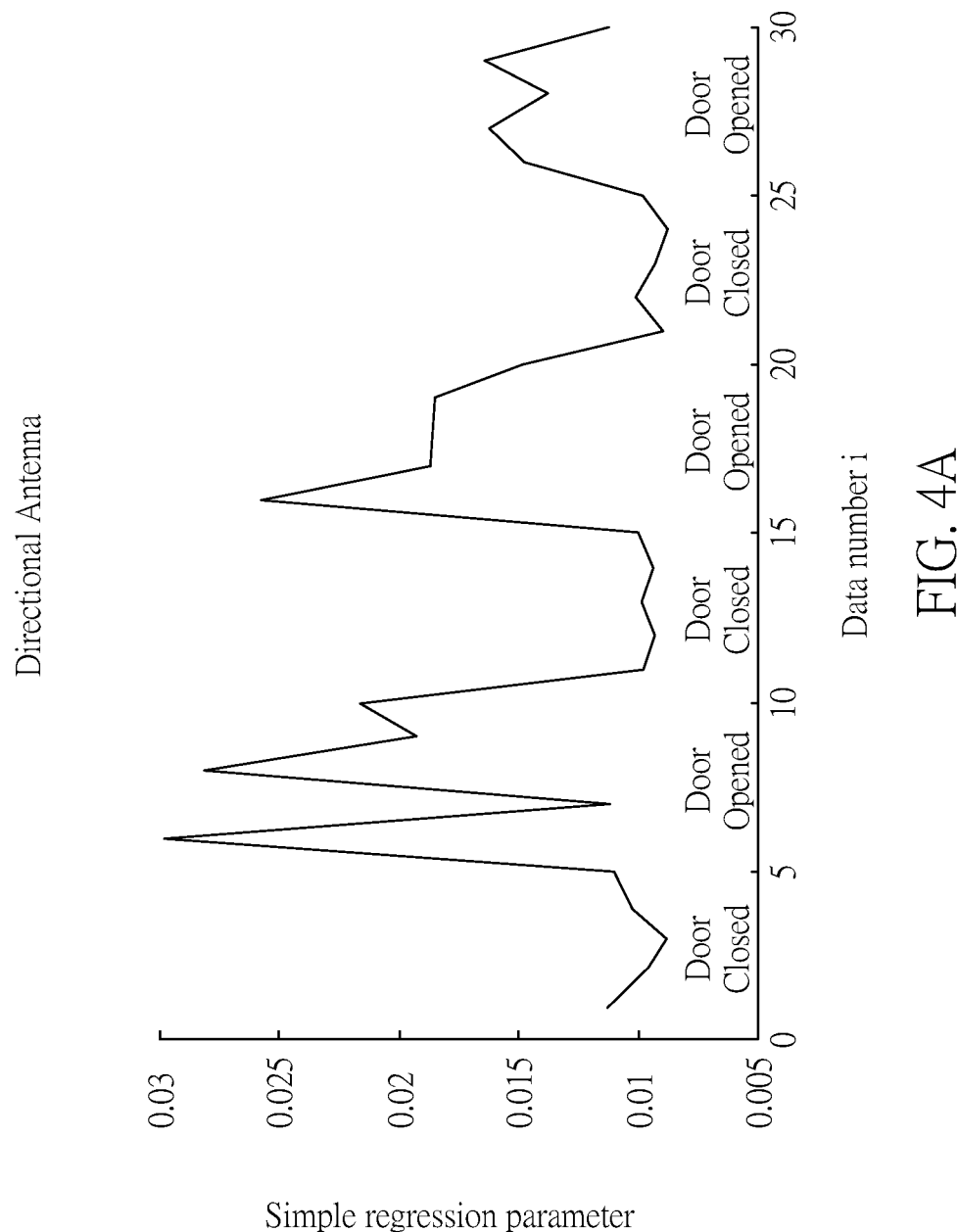
FIGS. 4A and 4B are graphs showing simple regression parameter changed with data number i by using the directional antenna and omni-directional antenna according to an embodiment of the present disclosure.
Figure 4B:
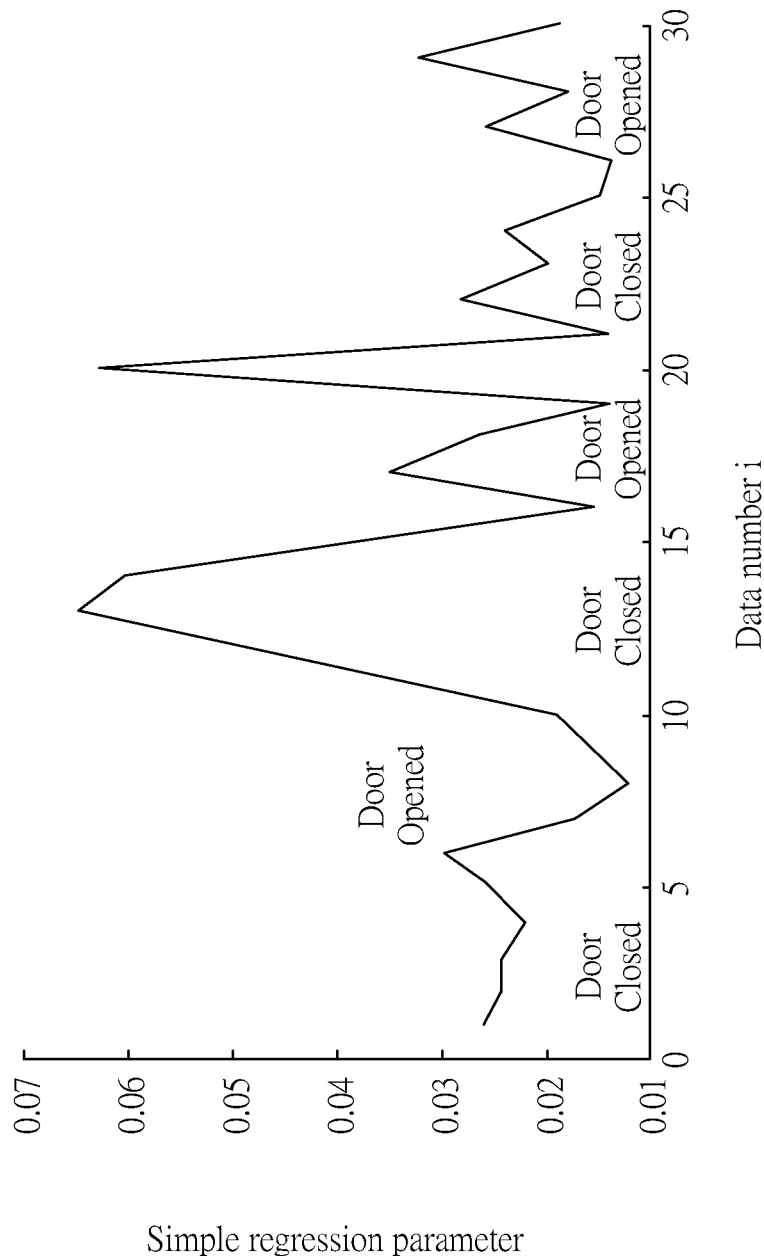

Reference is now made to FIGS. 4A and 4B, which are graph showing simple regression parameter changed with data number i by using the directional antenna and omni-directional antenna according to an embodiment of the present disclosure.

In FIGS. 4A and 4B, the directional antenna and the omni-directional antenna are respectively utilized for data number i from 1 to 30, and the detailed conditions in each of the data numbers are illustrated as follows:

Data number i from 1-5: For the original placement position of the furniture, in the door-closed state, the CSI is collected for five times, and the simple regression parameters of the curve formed by the eigenvalues in an order from the maximum to the minimum of the 56 subcarriers of each time is calculated, thus obtaining five records of data.

Data number i from 6-10: For the original placement position of the furniture, in the door-opened state, the CSI is collected for five times, and the simple regression parameters of the curve formed by the eigenvalues in an order from the maximum to the minimum of the 56 subcarriers of each time is calculated, thus obtaining five records of data.

Data number i from 11-15: The furniture are moved for the first time, the CSI is collected five times in the door-closed state, and the simple regression parameters of the curve formed by the eigenvalues in an order from the maximum to the minimum of the 56 subcarriers of each time is calculated, thus obtaining five records of data.

Data number i from 16-20: The furniture stay at same positions as the first time they were moved, the CSI is collected five times in the door-opened state, and the simple regression parameters of the curve formed by the eigenvalues in an order from the maximum to the minimum of the 56 subcarriers of each time is calculated, thus obtaining five records of data.

Data number i from 21-25: The furniture are moved for the second time, the CSI is collected five times in the door-closed state, and the simple regression parameters of the curve formed by the eigenvalues in an order from the maximum to the minimum of the 56 subcarriers of each time is calculated, thus obtaining five records of data.

Data number i from 26-30: The furniture stay at same positions as the second time they were moved, the CSI is collected five times in the door-opened state, and the simple regression parameters of the curve formed by the eigenvalues in an order from the maximum to the minimum of the 56 subcarriers of each time is calculated, thus obtaining five records of data.

Figure 5:
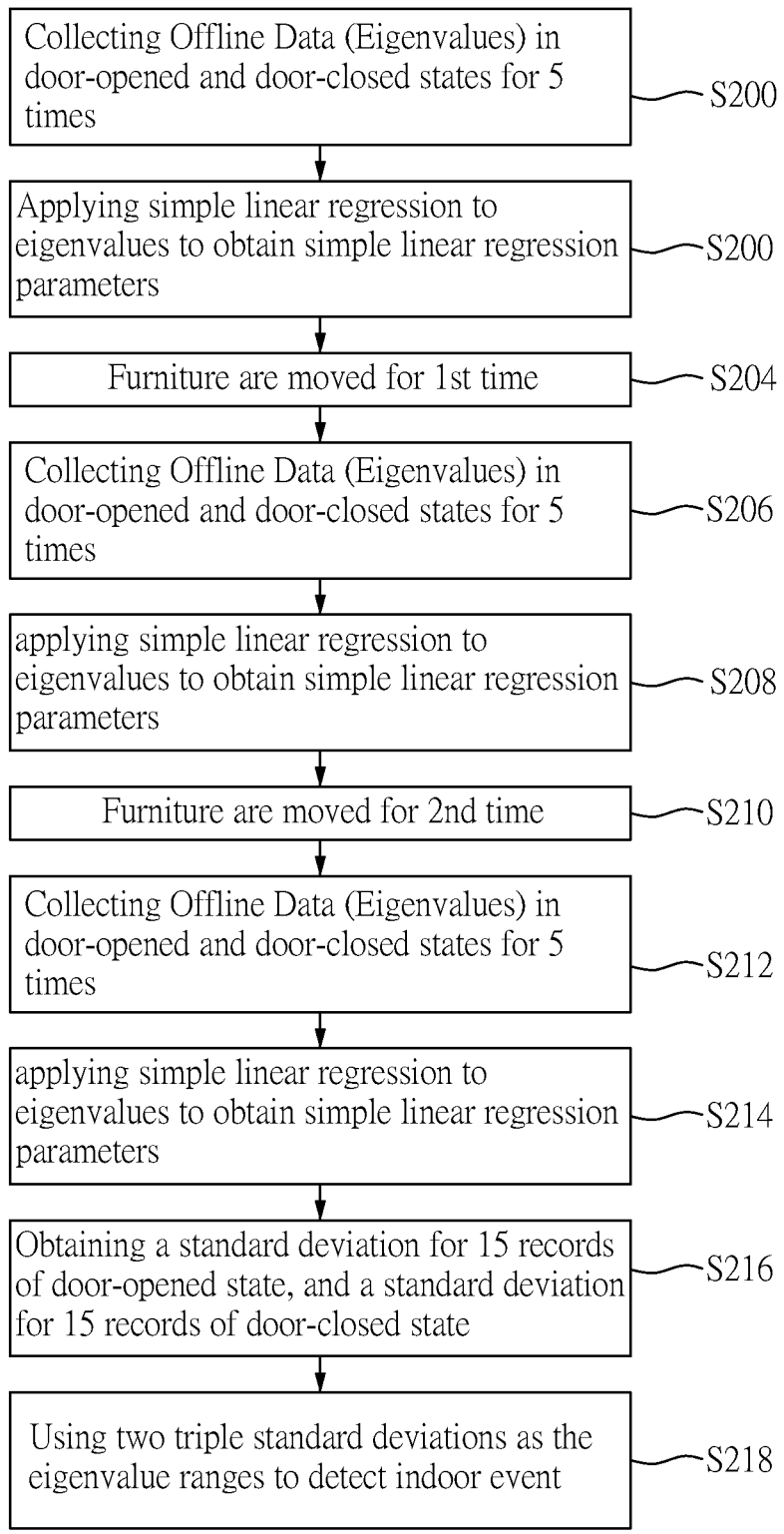
FIG. 5 is a flowchart according to an embodiment of the indoor event detection method of the present disclosure.

Reference is now made to FIG. 5, which is a flowchart according to an embodiment of the indoor event detection method of the present disclosure. As mentioned above, the method for the present embodiment may include the following steps:

Step S200: Collecting offline data (eigenvalues) in door-opened and door-closed states for 5 times.

Step S202: Applying simple linear regression to eigenvalues to obtain simple linear regression parameters.

Step S204: Furniture are moved for the first time.

Step S206: Collecting offline data (eigenvalues) in door-opened and door-closed states for 5 times.

Step S208: Applying simple linear regression to eigenvalues to obtain simple linear regression parameters.

Step S210: Furniture are moved for the second time.

Step S212: Collecting offline data (eigenvalues) in door-opened and door-closed states for 5 times.

Step S214: Applying simple linear regression to eigenvalues to obtain simple linear regression parameters.

Step S216: Obtaining a standard deviation for 15 records of door-opened state, and a standard deviation for 15 records of door-closed state.

Step S218: Using two triple standard deviations as the eigenvalue ranges to detect indoor event.

With the door-opened state and the door-closed state exemplified as a first event and a second event to be detected, during the detecting phase, the system is configured to perform the indoor event detection algorithm by using the two triple standard deviations as the eigenvalue ranges obtained from the average values of the historical simple regression parameter at the time of closing the door and the average value at the time of opening the door, the detection results for the directional antenna being shown in the following Table

TABLE I

| | | | | |
|---|---|---|---|---|
| i = 1, door-closed | i = 2, door-closed | i = 3, door-closed | i = 4, door-closed | i = 5, door-closed |
| i = 6, door-opened | i = 7, door-closed | i = 8, door-opened | i = 9, door-opened | i = 10, door-opened |
| i = 11, door-closed | i = 12, door-closed | i = 13, door-closed | i = 14, door-closed | i = 15, door-closed |
| i = 16, door-opened | i = 17, door-opened | i = 18, door-opened | i = 19, door-opened | i = 20, door-opened |
| i = 21, door-closed | i = 22, door-closed | i = 23, door-closed | i = 24, door-closed | i = 25, door-closed |
| i = 26, door-opened | i = 27, door-opened | i = 28, door-opened | i = 29, door-opened | i = 30, door-closed |

From Table I, it can be seen that the accuracy of the detection can reach about 93.33%.

In summary, since the omnidirectional antenna is replaced with the directional antenna, the indoor event detection system and method provided by the present disclosure may have the following advantages:

For changes in the indoor environment, the degree of variation is small and stable. There is no need to re-perform the offline training phase because of some changes in the room, wasting time and effort. After changing to the directional antenna, the switch door can still be detected stably, and accurate prediction can be obtained. Furthermore, the indoor guard detection performed by the above method is not possible for the omni-directional antenna, while the distinguishing of the door-opened state and the door-closed state is relatively clear for the directional antenna.

The principle components analysis utilized in the indoor event detection system and method provided by the present disclosure can concentrate the data used in the detection, thereby making the analysis more clear while reducing the complexity of the data. Therefore, in addition to simple regression, it is easier to identify the indoor event by using the directional antenna in the transmitter.

In another embodiment, a second way for generating the current eigenvalue statistic values according to the obtained multiple eigenvalues is to obtain a plurality of weight values of the plurality of eigenvalues by respectively dividing the plurality of eigenvalues with a summation of the plurality of eigenvalues, and to take one of the plurality of weight values with largest percentage among all of the plurality of weight values as the current eigenvalue statistical value.

When the weight values are utilized for determination, the first principle component can reflect the primary degrees of contribution of the total variation.

For example, 18 records of eigenvalues of the door-opened state and 16 records of eigenvalues of door-closed state are obtained, which include the measured values for moving the furniture two times.

The method for obtaining the eigenvalues including performing a covariance operation on the amplitude matrix to obtain a current covariance matrix as the statistical matrix is described in the above descriptions, and thus repeated descriptions are omitted.

In response to the using of the weight values, the first event CSI stored in the second memory 122 should be obtained from another probe signal sent from the transmitter when the first event occurs, and the first eigenvalue range obtained from the first event CSI by performing off-line training operations.

In the off-line training operations, a first amplitude matrix can be obtained by extracting a plurality of amplitudes of a plurality of sub-carriers from the current CSI, and the covariance operation is performed on the first amplitude matrix to obtain a first covariance matrix.

Similarly, a first diagonal eigenvalue matrix is obtained from the first covariance matrix, and elements of the first diagonal eigenvalue matrix are sorted, according to magnitudes of the elements, to obtain a first sorted eigenvalue matrix including a plurality of first eigenvalues.

Next, first weight values of the first eigenvalues are then obtained by dividing the plurality of first eigenvalues with a summation of the first eigenvalues, and the first eigenvalue range can be obtained according to a mean value and a standard deviation of the plurality of first weight values.

After the eigenvalues are obtained by sorting elements of the diagonal eigenvalue matrix, according to magnitudes of the elements, to obtain a sorted eigenvalue matrix, a maximum one of eigenvalues is selected, and for example, given the value of one of records is 134.2325.

Next, weight values of the eigenvalues are obtained by dividing the plurality of eigenvalues with a summation of the eigenvalues, and for example, given the summation value of the eigenvalues is 158.3371. Therefore, the largest weight value of the selected one eigenvalue is 134.2325/158.3371=0.8478.

Figure 6:
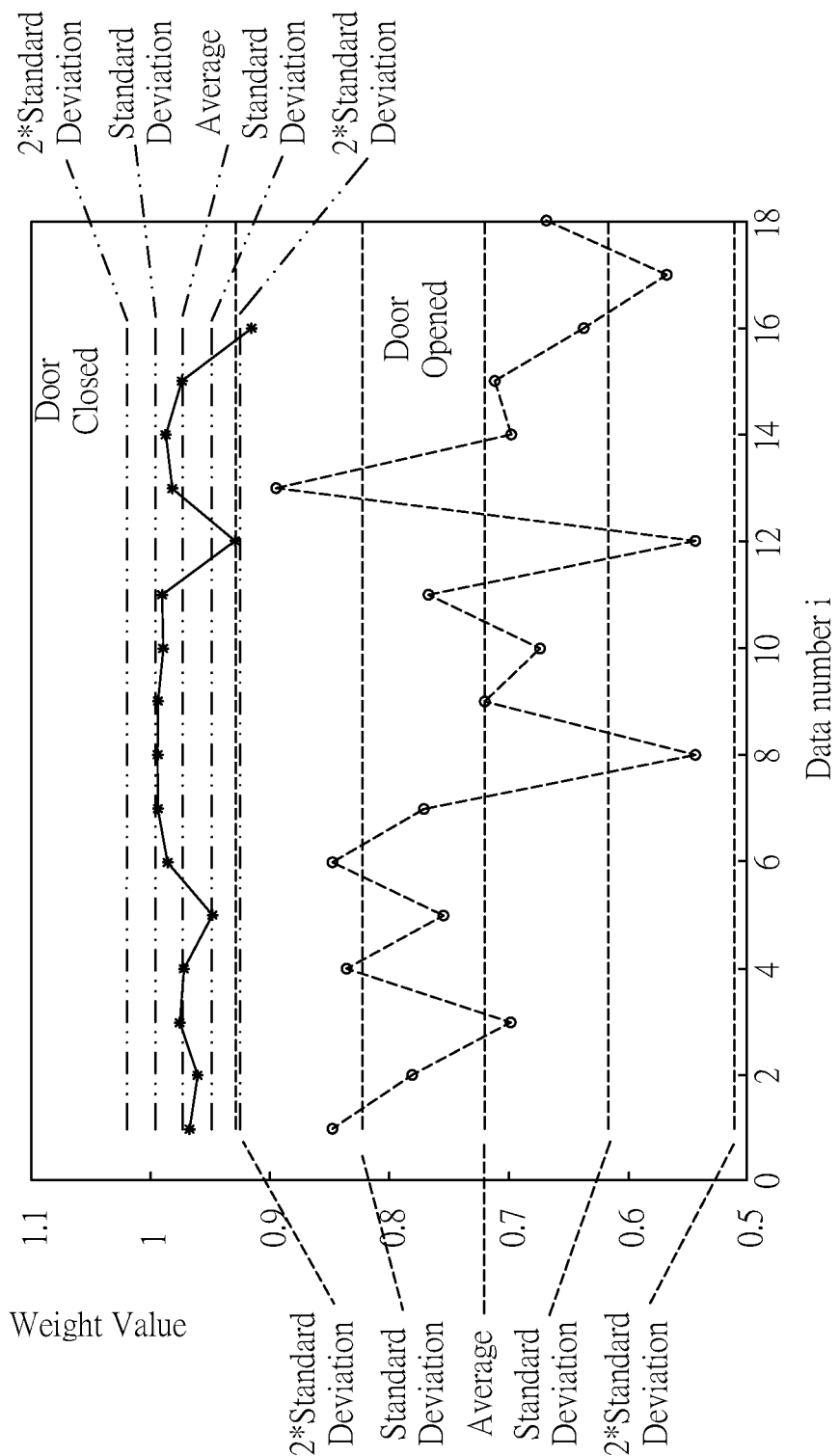
FIG. 6 is a graph showing a result for distinguishing the door-opened state from the door-closed state according to another embodiment of the present disclosure.

In this way, the largest weight values of the rest 33 records can be calculated. Reference is now made to FIG. 6, which is a graph showing a result for distinguishing the door-opened state from the door-closed state according to another embodiment of the present disclosure.

In this case, an average and a standard deviation is taken from the 18 records of weight values of the door-opened state, and an average and a standard deviation is taken from the 16 records of weight values of the door-closed state. As shown in FIG. 6, lines of the standard deviations and two times standard deviations are drawn while taking the average as center lines.

As can be seen, a discriminating rate can be found between the door-opened state and the door-closed state. That is, the weight values of the door-opened state and the door-closed state can be within ranges of two times of the standard deviations, and the ranges can be taken as thresholds for determining whether the door is opened. According to the result of the indoor event detection, the accuracy of the detection can reach about 97%.

From above, the indoor detection system and method provided by the present disclosure may utilize directional antennas for aiming at a region associated with an event to be detected to reduce costs of re-training, while analyzing eigenvalues of amplitudes of channel state information (CSI) to achieve an event detection mechanism with high stability.

For changes in the indoor environment, the degree of variation is small and stable for the present disclosure. There is no need to re-perform the offline training phase because of some changes in the room, wasting time and effort. After changing to the directional antenna, the switch door can still be detected stably, and accurate prediction can be obtained. Furthermore, the indoor guard detection performed by the above method is not possible for the omni-directional antenna, while the distinguishing of the door-opened state and the door-closed state is relatively clear for the directional antenna.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An indoor event detection system, comprising:
   a transmitter disposed at a first position in an indoor space, including a first antenna having a transmitting direction; and
   a receiver disposed at a second position in the indoor space, including:
   a second antenna communicating with the transmitter based on a line of sight link between the transmitter and the receiver covering an area to be detected in the indoor space, wherein the transmitter is configured to send a probe signal toward the transmitting direction, and the receiver is configured to receive the probe signal;
   a processor; and
   a memory storing first event channel state information (CSI) and a first eigenvalue range obtained from the first event CSI;
   wherein the processor is configured to detect whether an event associated to the indoor space is occurred by performing the following steps:
   obtaining a current CSI from the probe signal;
   obtaining an amplitude matrix by extracting a plurality amplitudes of a plurality of sub-carriers from the current CSI;
   applying a statistical operation on the amplitude matrix to obtain a statistical matrix;
   obtaining a plurality of eigenvalues from the statistical matrix;
   obtaining a current eigenvalue statistical value according to the plurality of eigenvalues; and
   determining whether the current eigenvalue statistical value is within the first eigenvalue range,
   wherein when the current eigenvalue statistical value is within the first eigenvalue range, a first event associated with the indoor space is determined to be occurred,
   wherein the statistical operation includes performing a covariance operation on the amplitude matrix to obtain a current covariance matrix as the statistical matrix,
   wherein obtaining the plurality of eigenvalues from the statistical matrix includes:
   obtaining a diagonal eigenvalue matrix from the current covariance matrix; and
   sorting elements of the diagonal eigenvalue matrix, according to magnitudes of the elements, to obtain a sorted eigenvalue matrix, wherein elements of the sorted eigenvalue serve as the plurality of eigenvalues.

2. The indoor event detection system according to claim 1, wherein obtaining a current eigenvalue statistical value according to the plurality of eigenvalues includes:
   applying a simple or multiple linear regression on the plurality of eigenvalues to obtain at least one linear regression parameter as the current eigenvalue statistical value.

3. The indoor event detection system according to claim 1, wherein obtaining a current eigenvalue statistical value according to the plurality of eigenvalues includes:
   obtaining a plurality of weight values of the plurality of eigenvalues by respectively dividing the plurality of eigenvalues with a summation of the plurality of eigenvalues; and
   taking one of the plurality of weight values with largest percentage among all of the plurality of weight values as the current eigenvalue statistical value.

4. The indoor event detection system according to claim 1, wherein the memory further stores second event CSI and a second eigenvalue range obtained from the second event CSI, and the processor is further configured to determine whether the current eigenvalue statistical value is within the first eigenvalue range or the second eigenvalue range,
   wherein when the current eigenvalue statistical value is within the second eigenvalue range, a second event associated with the indoor space is determined to be occurred.

5. An indoor event detection method, comprising:
   arranging a transmitter at a first position in an indoor space, wherein the transmitter includes a first antenna having a transmitting direction;
   arranging a receiver at a second position in the indoor space, wherein the receiver includes a second antenna communicating with the transmitter based on a line of sight link between the transmitter and the receiver covering an area to be detected in the indoor space, a processor and a memory storing first event channel state information (CSI) and a first eigenvalue range obtained from the first event CSI;
   configuring the transmitter to send a probe signal toward the transmitting direction;
   configuring the receiver to receive the probe signal;
   configuring the processor to detect whether an event associated to the indoor space is occurred by performing the following steps:
   obtaining a current CSI from the probe signal;

obtaining an amplitude matrix by extracting a plurality of amplitudes of a plurality of sub-carriers from the current CSI;

applying a statistical operation on the amplitude matrix to obtain a statistical matrix;

obtaining a plurality of eigenvalues from the statistical matrix;

obtaining a current eigenvalue statistical value according to the plurality of eigenvalues; and determining whether the current eigenvalue statistical value is within the first eigenvalue range, wherein when the current eigenvalue statistical value is within the first eigenvalue range, a first event associated with the indoor space is determined to be occurred, wherein the statistical operation includes performing a covariance operation on the amplitude matrix to obtain a current covariance matrix as the statistical matrix, wherein obtaining the plurality of eigenvalues from the statistical matrix includes:

obtaining a diagonal eigenvalue matrix from the current covariance matrix; and sorting elements of the diagonal eigenvalue matrix, according to magnitudes of the elements, to obtain a sorted eigenvalue matrix, wherein elements of the sorted eigenvalue serve as the plurality of eigenvalues.

6. The indoor event detection method according to claim 5, wherein obtaining a current eigenvalue statistical value according to the plurality of eigenvalues includes:

applying a simple or multiple linear regression on the plurality of eigenvalues to obtain at least one linear regression parameter at the current eigenvalue statistical value.

7. The indoor event detection method according to claim 5, wherein obtaining a current eigenvalue statistical value according to the plurality of eigenvalues includes:

obtaining a plurality of weight values of the plurality of eigenvalues by respectively dividing the plurality of eigenvalues with a summation of the plurality of eigenvalues; and taking one of the plurality of weight values with largest percentage among all of the plurality of weight values as the current eigenvalue statistical value.

8. The indoor event detection method according to claim 5, wherein the memory further stores second event CSI and a second eigenvalue range obtained from the second event CSI, and the processor is further configured to determine whether the current eigenvalue statistical value is within the first eigenvalue range or the second eigenvalue range, wherein when the current eigenvalue statistical value is within the second eigenvalue range, a second event associated with the indoor space is determined to be occurred.

* * * * *